(12) United States Patent
Okuno et al.

(10) Patent No.: US 9,553,300 B2
(45) Date of Patent: Jan. 24, 2017

(54) ELECTRODE MATERIAL; AND BATTERY, NONAQUEOUS-ELECTROLYTE BATTERY, AND CAPACITOR ALL INCORPORATING THE MATERIAL

(71) Applicant: SUMITOMO ELECTRIC INDUSTRIES, LTD., Osaka-shi, Osaka (JP)

(72) Inventors: Kazuki Okuno, Osaka (JP); Kengo Goto, Osaka (JP); Koutarou Kimura, Osaka (JP); Hajime Ota, Osaka (JP); Junichi Nishimura, Osaka (JP); Akihisa Hosoe, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 371 days.

(21) Appl. No.: 14/351,292

(22) PCT Filed: Oct. 9, 2012

(86) PCT No.: PCT/JP2012/076072
§ 371 (c)(1),
(2) Date: Apr. 11, 2014

(87) PCT Pub. No.: WO2013/061760
PCT Pub. Date: May 2, 2013

(65) Prior Publication Data
US 2014/0234720 A1 Aug. 21, 2014

(30) Foreign Application Priority Data

Oct. 24, 2011 (JP) .................................. 2011-233018

(51) Int. Cl.
*H01G 11/30* (2013.01)
*H01M 4/04* (2006.01)
(Continued)

(52) U.S. Cl.
CPC .......... *H01M 4/0416* (2013.01); *H01G 11/22* (2013.01); *H01G 11/30* (2013.01); *H01G 11/66* (2013.01);
(Continued)

(58) Field of Classification Search
None
See application file for complete search history.

(56) References Cited

U.S. PATENT DOCUMENTS 4,882,232 A * 11/1989 Bugnet ................. H01M 4/747
204/192.14
6,840,978 B2 * 1/2005 Matsuura .............. B22F 3/1137
419/14
(Continued)

FOREIGN PATENT DOCUMENTS

CN 101098004 A 1/2008
JP H06-290785 A 10/1994
(Continued)

*Primary Examiner* — Ula C Ruddock
*Assistant Examiner* — Matthew Van Oudenaren
(74) *Attorney, Agent, or Firm* — Drinker Biddle & Reath LLP

(57) ABSTRACT

The invention offers an electrode material that can accomplish both high capacity and high output and a battery, a nonaqueous-electrolyte battery, and a capacitor all incorporating the electrode material. The electrode material has a sheet-shaped aluminum porous body carrying an active material. The above-described aluminum porous body has a skeleton structure that is formed of an aluminum layer and that has a vacant space at the interior. When observed by performing cutting in a direction parallel to the direction of thickness of the sheet, the above-described vacant space in the skeleton structure has an average area of 500 $\mu m^2$ or more and 6,000 $\mu m^2$ or less.

8 Claims, 4 Drawing Sheets

(51) Int. Cl.
*H01M 4/1395* (2010.01)
*H01M 4/80* (2006.01)
*H01G 11/22* (2013.01)
*H01G 11/66* (2013.01)
*H01M 4/66* (2006.01)
*H01M 4/13* (2010.01)
*H01M 4/139* (2010.01)
*H01M 4/131* (2010.01)
*H01M 4/136* (2010.01)
*H01M 10/0525* (2010.01)

(52) U.S. Cl.
CPC .............. *H01M 4/043* (2013.01); *H01M 4/13* (2013.01); *H01M 4/139* (2013.01); *H01M 4/1395* (2013.01); *H01M 4/661* (2013.01); *H01M 4/80* (2013.01); *H01M 4/131* (2013.01); *H01M 4/136* (2013.01); *H01M 4/808* (2013.01); *H01M 10/0525* (2013.01); *H01M 2220/30* (2013.01); *Y02E 60/13* (2013.01)

(56) References Cited

U.S. PATENT DOCUMENTS

2005/0100782 A1* 5/2005 Iijima .................. H01M 2/0267
 429/137
2007/0025062 A1* 2/2007 Miyaki .................. H01G 9/016
 361/502

FOREIGN PATENT DOCUMENTS

| | | |
|---|---|---|
| JP | H08-69802 A | 3/1996 |
| JP | 08-170126 A | 7/1996 |
| JP | H09-199136 A | 7/1997 |
| JP | 2000-208150 A | 7/2000 |
| JP | 2001-143702 A | 5/2001 |
| JP | 2005-285629 | 10/2005 |

* cited by examiner though the thickness of the electrode is increased, the active material can be exploited, so that the utilization factor of the active material per unit volume is increased.
ELECTRODE MATERIAL; AND BATTERY, NONAQUEOUS-ELECTROLYTE BATTERY, AND CAPACITOR ALL INCORPORATING THE MATERIAL

TECHNICAL FIELD

The present invention relates to an electrode material that is a component for forming a battery, such as a nonaqueous-electrolyte battery, and a capacitor both used as a power source or the like of a small electronic device.

BACKGROUND ART

Aluminum is a material that is excellent in conductivity and corrosion resistance and is lightweight. In battery application, for example, as the positive electrode of a nonaqueous-electrolyte battery such as a lithium-ion battery, an aluminum foil is used by applying on its surface an active material such as lithium cobalt oxide. More specifically, a paste-like material formed by mixing a conductive aid, binder resin, and the like with a powder of active material such as lithium cobalt oxide is applied onto both surfaces of an aluminum foil and then dried to produce a positive electrode (Patent Literature 1).

On the other hand, a metallic porous body having a three-dimensional network structure is used in applications such as various filters and battery electrode. For example, CELMET (Registered trademark of Sumitomo Electric Industries, Ltd.) made of nickel is used as an electrode material of batteries such as a nickel-hydrogen battery and a nickel-cadmium battery. When such a metallic porous body is used as an electrode, the metallic porous body is filled with a paste-like material formed by mixing a conductive aid, binder resin, and the like with an active material to produce the electrode. For example, Patent Literature 2 describes an alkaline battery's electrode formed by filling a collector formed of a metallic porous body with an active material.

CITATION LIST

Patent Literature

Patent Literature 1: the published Japanese patent application Tokukai 2001-143702
Patent Literature 2: the published Japanese patent application Tokukaihei 8-69802

SUMMARY OF INVENTION

Technical Problem

In a nonaqueous-electrolyte battery, when the aluminum foil used as the positive electrode material is replaced with an aluminum porous body, the capacity of the positive electrode is increased because the interior of the aluminum porous body can be filled with an active material. The more specific reason is that even when the thickness of the electrode is increased, the active material can be exploited, so that the utilization factor of the active material per unit volume is increased.

As for the method of producing an electrode incorporating an aluminum porous body, as with an electrode incorporating a nickel porous body, a method can be conceived in which a metallic porous body is filled with a paste-like material (an active-material composite) formed by mixing a conductive aid, binder resin, and the like with an active material. More specifically, a sheet-shaped aluminum porous body is filled with an active-material composite (a filling step) and then the solvent contained in the active-material composite is dried. Subsequently, pressing is performed to compress the aluminum porous body in the direction of thickness of the sheet (a compressing step). The compressing step decreases the volume of the electrode, enabling the increase in the capacity per unit volume of the positive electrode. In addition, this step can decrease the contact resistance between the aluminum and the active material, thereby increasing the utilization factor of the active material.

In view of the increase in the capacity of the positive electrode and in the filling density of the active material, it is desirable that the compression in the compressing step be performed at an increased compression rate so that the thickness of the sheet of aluminum porous body can be decreased to the thinnest possible degree. Nevertheless, when the aluminum porous body is used as the electrode for batteries such as a nonaqueous-electrolyte battery, if the compression rate is excessively high, the vacant space in the electrode is decreased, so that the penetration of the electrolyte solution is decreased and consequently the output of the battery is decreased. In view of the above circumstances, an object of the present invention is to offer an electrode material that can accomplish both high capacity and high output and a battery, a nonaqueous-electrolyte battery, and a capacitor all incorporating the electrode material.

Solution to Problem

The present invention offers an electrode material that has a sheet-shaped aluminum porous body carrying an active material. In the electrode material:
 the above-described aluminum porous body has a skeleton structure that is formed of an aluminum layer and that has a vacant space at the interior, and
 when observed by performing cutting in a direction parallel to the direction of thickness of the sheet, the above-described vacant space in the skeleton structure has an average area of 500 $\mu m^2$ or more and 6,000 $\mu m^2$ or less.

FIG. 1 shows an example of an aluminum porous body to be used in the present invention. As shown in FIG. 1, the porous body is formed of a skeleton structure 4 having a three-dimensional network morphology. FIG. 2 is a schematic diagram showing the cross section of the skeleton structure 4 of the aluminum porous body. The skeleton structure 4 is formed of an aluminum layer 5 and has a vacant space 6 at the interior. The skeleton structure 4 has a cross section of a nearly triangular shape and has a diameter, which is expressed as the diameter "a" of the circle passing through the three apexes of the triangle, of 100 to 250 $\mu m$ or so. The cross-sectional shape of the skeleton structure is not limited to this shape; various shapes such as a circle, ellipse, and quadrilateral may be used.

FIG. 3 is a schematic cross-sectional diagram showing the state where the aluminum porous body is filled with an active material. An active material 7 is mainly positioned at the outside of the skeleton structure 4. After being filled with the active material, the aluminum porous body is compressed in the direction of thickness of the sheet. This operation collapses the skeleton structure 4, decreasing the area of the vacant space 6 at the interior. FIG. 4 is a schematic diagram showing this state. In an electrode for batteries such as a nonaqueous-electrolyte battery incorporating an aluminum porous body, when the average area of the vacant space 6 is specified at 500 µm² or more and 6,000 µm² or less, the electrolyte solution penetrates into the vacant space 6 of the skeleton structure. As a result, ions in the electrolyte solution are transported to the active material in the electrode, so that the output can be increased. In addition, because the vacant space 6 in the skeleton structure 4 is not filled with the active material, in order to increase the capacity per unit volume of the positive electrode, it is desirable that the area of the vacant space 6 not be excessively large. It is desirable that the area be 6,000 µm² or less, more desirably 4,000 µm² or less. In the above description, the average area of the vacant space is defined as the value obtained by averaging the areas of 30 vacant spaces.

It is desirable that the aluminum layer 5 have a thickness, "b," of 0.5 µm or more and 50 µm or less. If the aluminum layer 5 has a thickness of less than 0.5 µm, the strength of the aluminum porous body is decreased. If the aluminum layer has a thickness of more than 50 µm, the porosity of the aluminum porous body is decreased. It is more desirable that the thickness be 3 µm or more and 30 µm or less, preferably 5 µm or more and 20 µm or less.

It is desirable that the active material be at least one member selected from the group consisting of lithium cobalt oxide, lithium nickel oxide, lithium cobalt nickel oxide, lithium manganate, and lithium titanate.

The present invention also offers a method of producing an electrode material. The method has:
 (a) a step of preparing a sheet-shaped aluminum porous body having a skeleton structure that is formed of an aluminum layer and that has a vacant space at the interior,
 (b) a filling step of filling an active material into the above-described aluminum porous body, and
 (c) a compressing step of compressing the aluminum porous body filled with the above-described active material in the direction of thickness of the sheet.

In this method, after the above-described compressing step, when observed by performing cutting in a direction parallel to the direction of thickness of the sheet, the above-described vacant space in the skeleton structure has an average area of 500 µm² or more and 6,000 µm² or less. Because after the compressing step, the vacant space has an area of 500 µm² or more and 6,000 µm² or less, the output of the battery can be increased.

It is desirable that the average area of the above-described vacant space in the skeleton structure observed by performing cutting in a direction parallel to the direction of thickness of the sheet after the above-described compressing step be 40% or more of the average area of the above-described vacant space in the skeleton structure observed by performing cutting in a direction parallel to the direction of thickness of the sheet before the above-described compressing step. When the vacant space remains such that the area after the compressing step is 40% or more of the area before the compressing step, the electrolyte solution penetrates into the vacant space, so that the output of the battery can be increased.

The present invention also offers a battery incorporating the above-described electrode material as a positive electrode, a negative electrode, or both. The use of the above-described electrode material for battery enables an increase in capacity and output of the battery. In particular, the electrode material can be used advantageously in nonaqueous-electrolyte batteries such as a lithium-ion battery. Furthermore, the present invention offers a capacitor incorporating the above-described electrode material. The use of the above-described electrode material enables an increase in capacity and output of the capacitor.

Advantageous Effects of Invention

The present invention can offer an electrode material that can accomplish both high capacity and high output and a battery, a nonaqueous-electrolyte battery, and a capacitor all incorporating the electrode material.

DESCRIPTION OF EMBODIMENTS

In the following, an explanation is given to embodiments of the present invention. In the following drawing to be referred, the portions bearing the same number are the identical portions or portions equivalent to each other. The present invention is not limited to the embodiments described. The scope of the present invention is shown by the scope of the appended claims. Accordingly, the present invention is intended to cover all revisions and modifications included within the meaning and scope equivalent to the scope of the claims.

Process of Producing Aluminum Porous Body

Figure 1:
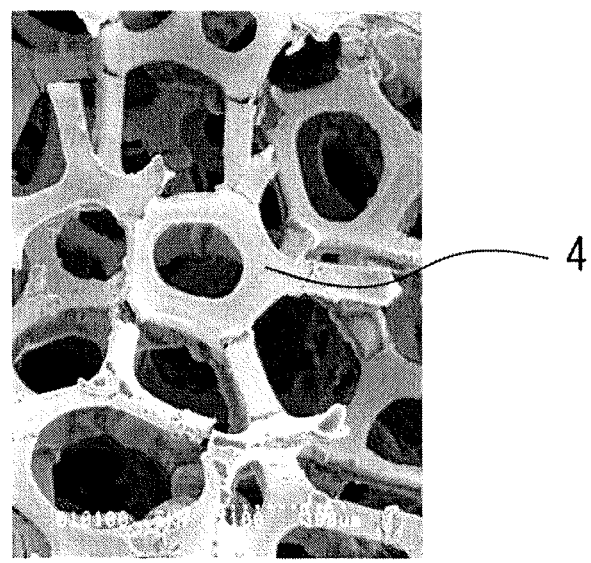
FIG. 1 is an enlarged surface photograph of an aluminum porous body.
Figure 2:
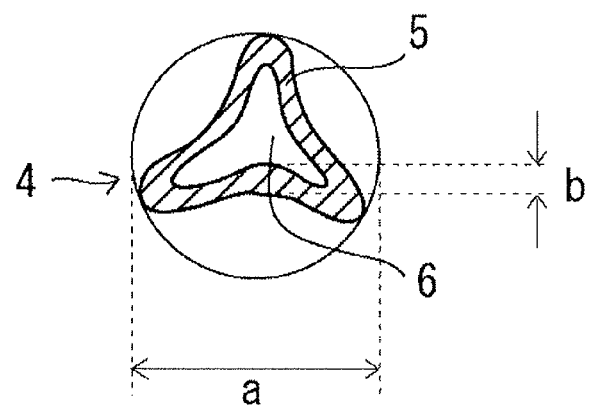
FIG. 2 is a schematic diagram showing the cross section of the skeleton structure of an aluminum porous body.
Figure 3:
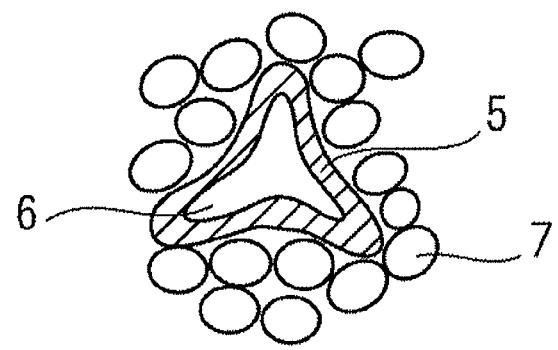
FIG. 3 is a schematic cross-sectional diagram showing the state where the aluminum porous body is filled with all active material.
Figure 4:
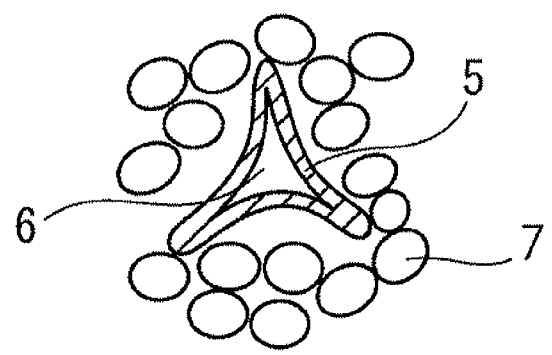
FIG. 4 is a schematic cross-sectional diagram showing the state where after being filled with an active material, an aluminum porous body is compressed in the direction of the thickness.
Figure 5:
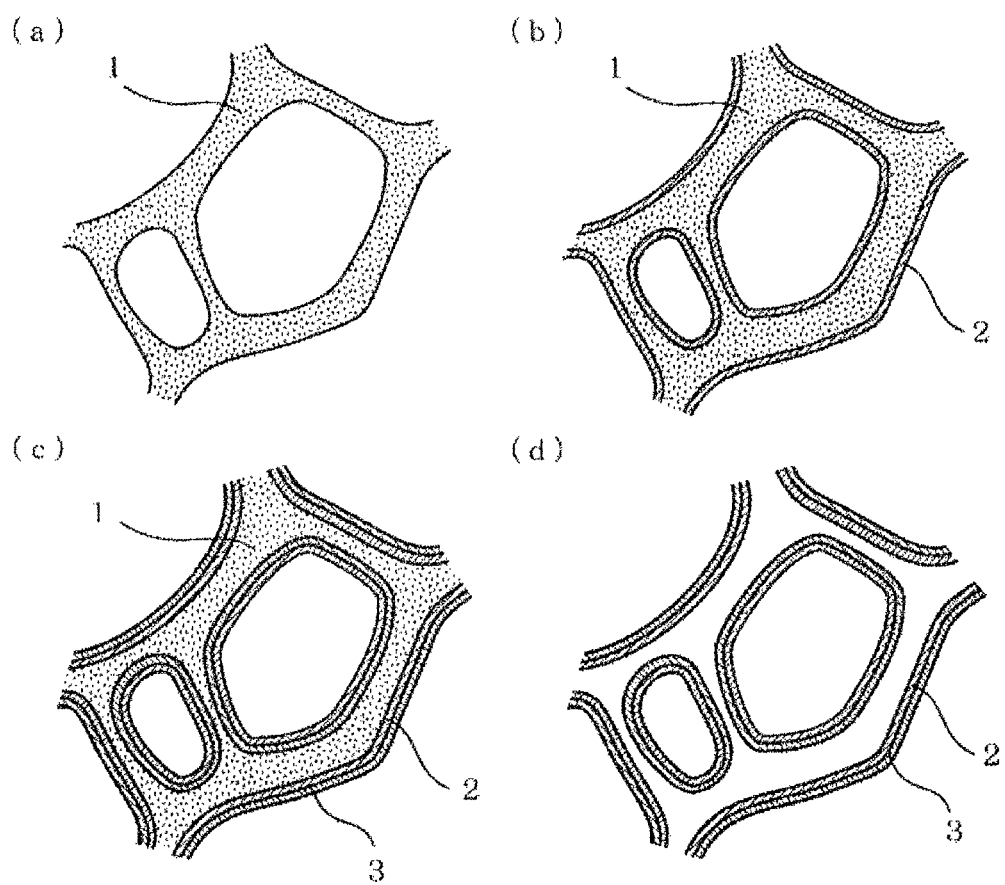
FIG. 5 is a schematic cross-sectional diagram for explaining the process of producing an aluminum porous body.

FIG. 5 is a diagram for explaining an example of the process of producing an aluminum porous body. It is a schematic cross-sectional diagram showing a process in which an aluminum porous body is formed by using a resinous porous body as a core material. FIG. 5 (a) is an enlarged schematic diagram drawn by enlarging the surface of a resinous porous body (a foamed resinous formed body) having a three-dimensional network structure as an example of a base resinous formed body. Pores are formed by using a foamed resinous formed body 1 as the skeleton. Next, the surface of the foamed resinous formed body is given conductivity. As shown in FIG. 5 (b), this step forms a thin conductive layer 2 formed of a conductive material on the surface of the foamed resinous formed body 1. Subsequently, aluminum plating is performed in a molten salt to form an aluminum plating layer 3 on the surface of the resinous formed body having the conductive layer (FIG. 5 (c)). This operation produces an aluminum porous body formed of the aluminum plating layer 3 formed on the surface of the resinous formed body, which is used as the base material. Next, the base resinous formed body is removed. By eliminating the foamed resinous formed body 1 through decomposition or otherwise, an aluminum porous body having only metallic layers can be obtained (FIG. 5 (d)). An explanation is given below to the individual steps in the order of processing.

Preparation of Resinous Porous Body

A resinous porous body having a three-dimensional network structure is prepared. Any resin may be selected as the material for the resinous porous body. Polyurethane, melamine, polypropylene, and polyethylene can be shown as examples of the material of the foamed resinous formed body. A resinous porous body having any shape may be selected provided that it has continuous pores (communicating pores). It is desirable that the resinous porous body have a porosity of 80% to 98% and a pore diameter of 50 to 1,000 μm. A urethane foam and a melamine foam can be used advantageously as the resinous porous body because they have not only high porosity and pore communicability but also excellent thermal-decomposition property. A urethane foam is desirable in terms of uniformity in pore and easy availability. A melamine foam is desirable because a product having a small pore diameter is available.

The skeleton of the urethane foam has a nearly triangular shape in the cross section perpendicular to the extending direction of the skeleton. Here, the porosity is defined by the following equation:

Porosity=(1−(weight of porous body [g]/(volume of porous body [cm$^3$]×density of material)))× 100[%].

The pore diameter is obtained as follows. The surface of the resinous formed body is enlarged with a microscope photograph or the like. The number of pores per one inch (25.4 mm) is counted as the number of cells. The average value is obtained by using the following equation: average pore diameter=25.4 mm/the number of cells.

Formation of Aluminum Layer

An aluminum layer is formed on the surface of a resinous porous body. The aluminum layer can be formed by any method including a gas phase method such as vapor deposition, sputtering, and plasma CVD; application of aluminum paste; and a plating method. Because plating of aluminum in an aqueous solution is practically almost impossible, it is desirable to perform molten-salt electrolytic plating, which plates aluminum in a molten salt. Molten-salt electrolytic plating is conducted as follows. A salt of a two-component system such as an $AlCl_3$—XCl (X: alkali metal) system or of a multiple component system is used. A resinous porous body is immersed in a molten salt. A potential is applied onto an aluminum plate to perform electrolytic plating. As the molten salt, a eutectic salt of organohalide and aluminum halide may be used. As the organohalide, an imidazolium salt, a pyridinium salt, and so on may be used. Of these, 1-ethyl-3-methylimidazolium chloride (EMIC) and butylpyridinium chloride (BPC) are desirable. To perform electrolytic plating, the surface of the resinous porous body is given conductivity in advance. The conductivity-giving treatment can be conducted by any method including non-electrolytic plating of conductive metal such as nickel, vapor deposition and sputtering of aluminum or the like, and application of a conductive coating containing conductive particles such as carbon particles.

Removal of Resin

Next, the resin is removed to obtain an aluminum porous body. The resin can be removed by any method including decomposition (dissolution) by using an organic solvent, a molten salt, or supercritical water and thermal decomposition. Unlike nickel and the like, aluminum is difficult to treat by reduction once it is oxidized. Consequently, it is desirable to remove the resin by a method that is less likely to oxidize aluminum. For example, a method is advantageously employed that removes the resin by thermal decomposition in a molten salt as explained below.

The thermal decomposition in a molten salt is performed through the process described below. A resinous porous body, on the surface of which an aluminum plating layer is formed, is immersed in a molten salt. While a negative potential is being applied to the aluminum layer, heating is conducted to decompose the resinous porous body. In the state of immersion in the molten salt, the application of a negative potential can decompose the resinous porous body without oxidizing the aluminum. The heating temperature can be selected appropriately in accordance with the type of the resinous porous body. Nevertheless, in order not to melt the aluminum, it is necessary to perform the treatment at a temperature not higher than the melting point of aluminum (660° C.). The desirable temperature range is 500° C. or more and 650° C. or less. The value of the negative potential to be applied is specified to be at the negative side relative to the reducing potential of aluminum and at the positive side relative to the reducing potential of the cation in the molten salt.

As the molten salt to be used for the thermal decomposition of the resin, a salt of a halogenide or a nitrate of alkali metal or alkaline earth metal both of which cause the electrode potential of aluminum to become base can be used. More specifically, it is desirable that the molten salt contain at least one member selected from the group consisting of lithium chloride (LiCl), potassium chloride (KCl), sodium chloride (NaCl), aluminum chloride ($AlCl_3$), lithium nitrate ($LiNO_3$), lithium nitrite ($LiNO_2$), potassium nitrate ($KNO_3$), potassium nitrite ($KNO_2$), sodium nitrate ($NaNO_3$), and sodium nitrite ($NaNO_2$). This method enables the production of an aluminum porous body whose oxide layer on the surface is thin and whose oxygen content is small. The aluminum porous body is required only to have the shape of a sheet without being particularly limited in size. Considering the easiness of the operation in the subsequent steps, for example, a sheet having a width of about 1 m, a length of about 200 m, and a thickness of about 1 mm is used.

Production of Electrode for Nonaqueous-Electrolyte Battery: Production of Slurry of Active Material As the active material, lithium cobalt oxide ($LiCoO_2$), lithium manganite ($LiMn_2O_4$), lithium nickel oxide ($LiNiO_2$) and the like are used. A slurry is produced by mixing the active material with a conductive aid such as acetylene black, a binder such as polyvinylidene fluoride (PVDF), and a solvent such as N-methyl-2-pyrrolidone (NMP). The mixing ratio of these materials is appropriately determined by considering the capacity of the electrode, the conductivity, the viscosity of the slurry, and so on.

Next, an explanation is given to the process of producing the electrode for a nonaqueous-electrolyte battery. After an aluminum porous body wound in the shape of a roll is unwound, the electrode is produced in the order of a thickness-adjusting step, a lead-welding step, a slurry-filling step, a drying step, a compressing step, and a cutting step. In the thickness-adjusting step, the sheet-shaped aluminum porous body is adjusted to have a specified thickness, so that the variations in thickness are decreased. After a lead is welded to the thickness-adjusted aluminum porous body, the aluminum porous body is filled with the above-described slurry of active material by using a roller. Then, the porous body passes through a drying furnace to be dried, so that the solvent in the slurry of active material is removed.

The aluminum porous body further passes through a roller, so that it is compressed in the direction of thickness of the sheet. This compressing step decreases the area of the vacant space in the skeleton structure of the aluminum porous body, thereby increasing the filling density of the active material. Then, as required, cutting is conducted in the directions of the length and thickness to obtain an electrode for a nonaqueous-electrolyte battery. In this case, the aluminum porous body filled with the active material may be used as an electrode for a nonaqueous-electrolyte battery without undergoing the compressing step.

The average area of the vacant space before and after the compressing step is obtained by the method described below. A sheet-shaped aluminum porous body is cut in a direction parallel to the direction of thickness of the sheet. The cross section is enlarged by 300 times or so by using a microscope photograph or the like. Lattice-forming lines having a width of 5 to 10 μm are drawn in a skeleton structure portion including a vacant space. The number of lattices ($N_1$) that contain a vacant space in part of a lattice or in an entire lattice and the number of lattices ($N_2$) that contain the vacant space in an entire lattice are counted. The area of the vacant space is calculated by Eq. (1) shown below. Areas of 30 vacant spaces are obtained, and the average value thereof is defined as an average area.

$$\text{Area } (\mu m^2) = \text{Lattice area } (\mu m^2) \times [N_2 + (N_1 - N_2)/2] \quad (1)$$

It is specified that the average area of the vacant space is 500 μm² or more and 6,000 μm² or less. If the average area is large, the electrolyte solution is likely to penetrate into the skeleton structure. Consequently, even when the battery is used for large current, its service capacity can be increased. The more desirable range of the average area is 500 μm² or more and 4,000 μm² or less. Because the vacant space 6 in the skeleton structure 4 is not filled with an active material, in order to increase the capacity per unit volume of the positive electrode, it is desirable that the area of the vacant space 6 not be excessively large; it is desirable that the area be 6,000 μm² or less, more desirably 4,000 μm² or less.

Nonaqueous-Electrolyte Battery

A nonaqueous-electrolyte battery has a positive electrode formed of the above-described electrode, a negative electrode made of graphite, and an electrolyte composed of a nonaqueous electrolyte solution dissolving a lithium salt. As the nonaqueous electrolyte solution, ethylene carbonate (EC), diethyl carbonate (DEC), dimethyl carbonate, propylene carbonate, γ-butyrolactone and the like may be used. As the lithium salt, lithium tetrafluoroborate, lithium hexafluorophosphate, and the like may be used. Between the electrodes, a separator composed of porous polymer film, nonwoven fabric, or the like is placed. Both electrodes and the separator are impregnated with the nonaqueous electrolyte solution. Because an aluminum porous body having a large surface area is used as the material of the positive electrode, even the use of a small electrode area can increase the capacity, so that the energy density of the battery can be increased. The vacant space in the electrode is not entirely compressed, that is, a certain portion of the vacant space remains. Consequently, the nonaqueous electrolyte solution penetrates into the vacant space, thereby enabling the attainment of high output.

Electrode Material for Molten-Salt Battery

The electrode material of the present invention can also be used as the electrode material for a molten-salt battery. When the electrode material is used as the positive-electrode material for a molten-salt battery, as the active material, sodium chromate ($Na_2CrO_4$), sodium chromite ($NaCrO_2$), titanium disulfide ($TiS_2$), or another metallic compound is used that can intercalate the cation of a molten salt, which becomes an electrolyte. The active material is used in combination with a conductive aid and a binder. As the conductive aid, acetylene black may be used. As the binder, polyvinylidene fluoride (PVDF), polytetrafluoroethylene (PTFE), and the like may be used. An active material, conductive aid, binder, and solvent are mixed to produce a slurry of active material. As with the electrode for a nonaqueous-electrolyte battery, an aluminum porous body is filled with the slurry of active material to produce the electrode material.

Molten-Salt Battery

An explanation is given to the structure of a molten-salt battery incorporating the above-described electrode material as the positive electrode. As the negative electrode, an electrode material is used that incorporates an active material composed of sodium alone, sodium alloyed with other metals, carbon, or the like. Because sodium has a melting point of about 98° C. and the metal softens as the temperature rises, it is desirable that the sodium be alloyed with another metal (Si, Sn, In, or the like). Of these, in particular, an alloy of sodium and Sn is desirable because it is easy to handle. These positive- and negative-electrode materials and a separator are housed in a case. As the electrolyte, a molten salt is used. As the molten salt, various inorganic and organic salts may be used that melt at the operating temperature. The types of anion of the molten salt include bis(fluorosulfonyl) amide ion (FSA ion) and bis(trifluoromethylsulfonyl)amide ion (TFSA ion). As the cation of the molten salt, at least one member may be used that is selected from the group consisting of alkali metals, such as lithium (Li), sodium (Na), potassium (K), rubidium (Rd), and cesium (Cs); and alkaline earth metals, such as beryllium (Be), magnesium (Mg), calcium (Ca), strontium (Sr), and barium (Ba).

Electrode Material for Capacitor

The electrode material of the present invention may also be used as the electrode material for capacitors, such as a lithium-ion capacitor and an electric-double-layer capacitor. When the material is used as the electrode for a capacitor, an aluminum porous body is filled with activated carbon as the active material. Because the capacity of the capacitor increases with increasing surface area of the activated carbon, activated carbon having a specific surface area of 1,000 m²/g or more can be advantageously used. The activated carbon is used in combination with a conductive aid, a binder, and the like. As with the electrode for a nonaqueous-electrolyte battery, an aluminum porous body is filled with a slurry of active material containing the activated carbon to produce the electrode material.

Electric-Double-Layer Capacitor

The above-described electrode material for a capacitor is die-cut to obtain two sheets having a proper size. A separator is sandwiched between the two sheets. It is desirable that the separator be produced by using nonwoven fabric or a porous membrane composed of cellulose, polyolefin resin, or the like. The assembly is housed in a cell case by using a necessary spacer to be impregnated with an electrolyte solution. Finally, a lid is attached to the case through an insulation gasket to seal the case. Thus, an electric-double-layer capacitor can be produced. As the electrolyte solution, both an aqueous-based electrolyte solution and a nonaqueous-based electrolyte solution can be used. However, a nonaqueous-based electrolyte solution is desirable because it allows the specifying of an increased voltage. In an aqueous-based electrolyte solution, as the electrolyte, potassium hydroxide and the like may be used; in a nonaqueous-based electrolyte solution, an ionic liquid may be used. As the cation of the ionic liquid, lower aliphatic quaternary ammonium, lower aliphatic quaternary phosphonium, imidazolium, and the like may be used. As the anion, a metal chloride ion, a metal fluoride ion, imide compounds such as bis(fluorosulfonyl)imide, and the like may be used. As the organic solvent, ethylene carbonate, diethyl carbonate, dimethyl carbonate, propylene carbonate, and the like may be used. As the supporting electrolyte in the nonaqueous electrolyte solution, lithium tetrafluoroborate, lithium hexafluorophosphate, and the like are used. When the nonaqueous-based material is used, in order to decrease the moisture in the capacitor to the lowest possible degree, it is desirable to sufficiently dry the materials such as the electrode.

Lithium-Ion Capacitor

The above-described capacitor-use electrode material formed by filling activated carbon into an aluminum porous body is used as the positive electrode. The positive electrode is combined with a negative electrode, separator, and organic electrolyte solution to produce a lithium-ion capacitor. The negative electrode has no particular limitations; the negative electrode for a conventional lithium-ion secondary battery may be used. Nevertheless, the conventional electrode whose collector is formed by using copper foil has a small capacity. Consequently, it is desirable to use an electrode formed by filling an active material into a copper or nickel porous body such as a nickel foam. To cause the capacitor to operate as a lithium-ion capacitor, it is desirable to dope lithium ions into the negative electrode in advance. As for the doping method, a known method can be used. Examples of the method include a doping method in which a lithium metal foil is attached to the surface of the negative electrode to be immersed in an electrolyte solution and an electrically doping method in which an electrode to which a lithium metal is attached is placed in a lithium-ion capacitor and after the cell is assembled, a current is supplied between the negative electrode and the lithium metal electrode. As for the electrolyte solution, an electrolyte solution similar to the nonaqueous electrolyte solution used in a nonaqueous-electrolyte battery may be used. It is desirable that the separator be produced by using nonwoven fabric or a porous membrane composed of cellulose, polyolefin resin, or the like. The separator is sandwiched between the above-described positive electrode and negative electrode. The assembly is housed in a cell case by using a necessary spacer to be impregnated with an electrolyte solution. Finally, a lid is attached to the case through an insulation gasket to seal the case. Thus, a lithium-ion capacitor can be produced.

Example 1

Production of Aluminum Porous Body

A sheet-shaped urethane foam having a thickness of 1.0 mm, a porosity of 97%, and a pore diameter of 450 μm was prepared. The foam was immersed in a carbon suspension and then dried to form a conductive layer composed of carbon particles adhering to the surface. The constituents of the suspension included 25% total of graphite and carbon black, a resinous binder, a penetrant, and an antifoamer. The carbon black had a particle diameter of 0.5 μm.

Molten-Salt Plating

The urethane foam having a conductive layer on its surface was used as a work. After being set on a jig having a current-feeding function, the work was placed in a globe box having an argon atmosphere of a low moisture content (dew point: −30° C. or below) to be immersed in a molten-salt bath (33 mol % EMIC and 67 mol % $AlCl_3$). The jig, on which the work was set, was connected to the negative electrode of a rectifier, and the opposite electrode formed of an aluminum plate (purity: 99.99%) was connected to the positive electrode. Then, DC current was supplied to perform aluminum plating. The plating bath was held at a temperature of 60° C.

Decomposition of Resinous Porous Body

The urethane foam having an aluminum plating layer on its surface was immersed in an LiCl—KCl eutectic molten salt at a temperature of 500° C. Then, a negative potential of −1 V was applied for 5 minutes to decompose and remove the polyurethane, so that an aluminum porous body was obtained.

Filling of Active Material

Figure 6:
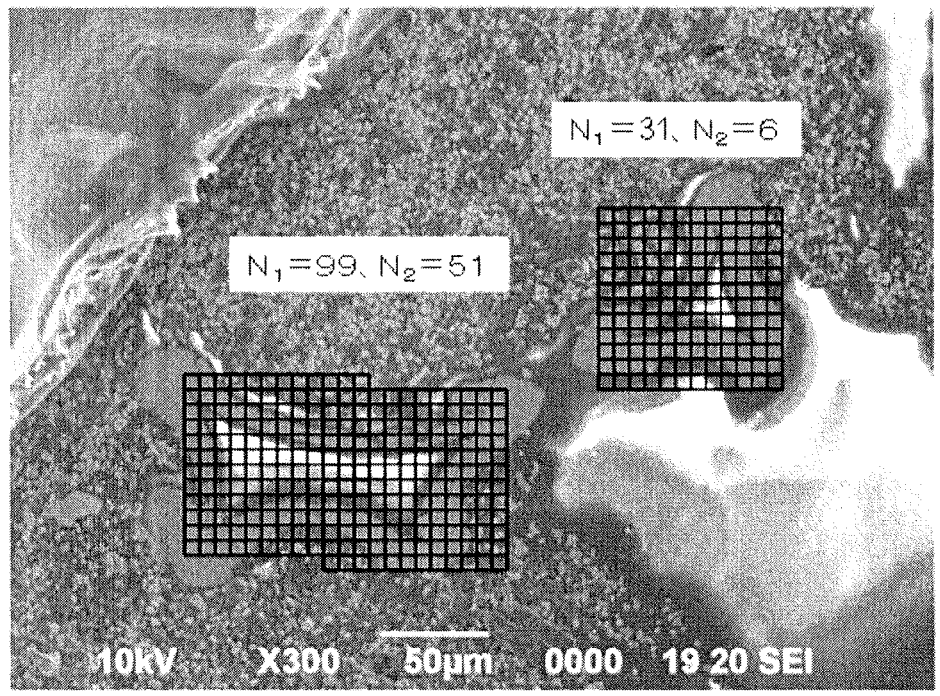
FIG. 6 is an SEM photograph showing a cross section of the skeleton structure of an aluminum porous body before the compressing.

A slurry of active material was produced by using lithium cobalt oxide ($LiCoO_2$) as the active material; by mixing $LiCoO_2$, acetylene black, and PVDF at a mass ratio of 88:6:6; and further by adding NMP as the solvent to the mixture. The above-described aluminum porous body was filled with this slurry and dried. The aluminum porous body filled with the active material had a thickness of 1.0 mm. A part of the porous body was sampled, the sample was cut in the direction of the thickness, and the cross section was subjected to SEM observation to obtain the area of the vacant space in the skeleton structure. FIG. 6 shows an example of a photograph of the skeleton structure. Lattices of a 7-μm width are delineated; the vacant space in the skeleton structure is located at the center portion of the lattices. At the left-side vacant space in FIG. 6, the number of lattices ($N_1$) that contain the vacant space in part of a lattice or in an entire lattice is 99, and the number of lattices ($N_2$) that contain the vacant space in an entire lattice is 51. Therefore, the area of the vacant space is:

$$7 \times 7 \ (\mu m^2) \times [51 + (99-51)/2] = 49 \times 75 = 3,675 \ (\mu m^2).$$

At the right-side vacant space, the number of lattices ($N_1$) that contain the vacant space in part of a lattice or in an entire lattice is 31, and the number of lattices ($N_2$) that contain the vacant space in an entire lattice is 6. Therefore, the area of the vacant space is:

$$7 \times 7 \ (\mu m^2) \times [6 + (31-6)/2] = 49 \times 18.5 = 906.5 \ (\mu m^2).$$

The same calculations were conducted for 30 vacant spaces. The obtained values were averaged to obtain the average area of the vacant space. The average area was 1,333 $\mu m^2$.

Evaluation of Battery

The obtained electrode for a nonaqueous-electrolyte battery was used as the positive electrode; a lithium metal foil, as the negative electrode; a glass fiber filter, as the separator; and an EC/DEC solution containing 1 mol/L of $LiPF_6$, as the electrolyte solution. With this preparation, a 0.2 C service capacity and a 2 C service capacity were measured. The filling capacity calculated by using the filling quantity of the active material is 8 $mAh/cm^2$.

Example 2

Figure 7:
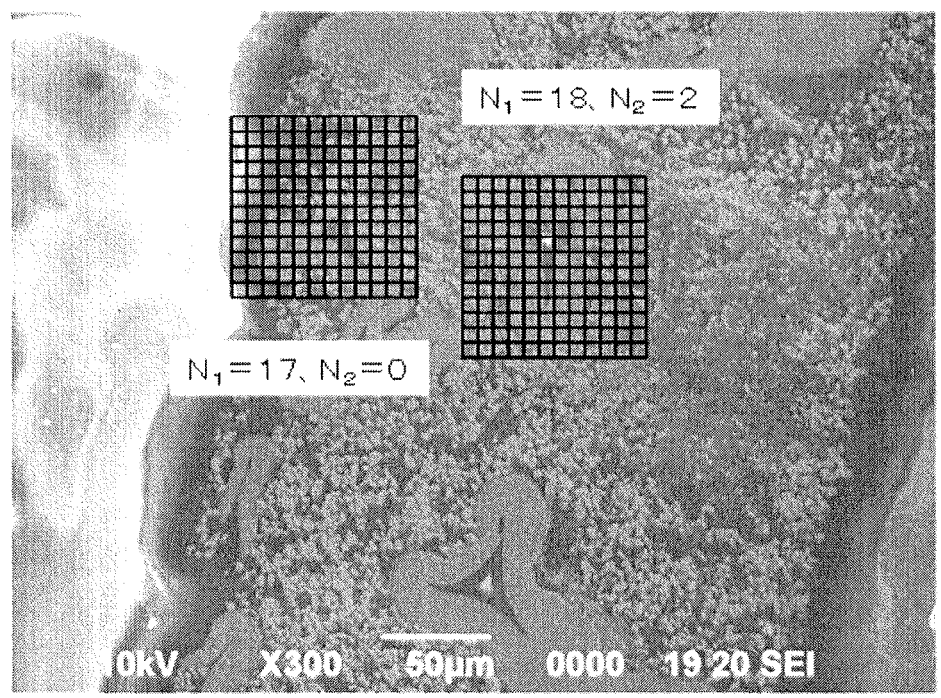
FIG. 7 is an SEM photograph showing a cross section of the skeleton structure of an aluminum porous body after the compressing.

An aluminum porous body filled with the active material produced in Example 1 was compressed so as to have a thickness of 0.5 mm to produce an electrode for a nonaqueous-electrolyte battery. A part of the electrode was sampled, the sample was cut in the direction of the thickness, and the cross section was subjected to SEM observation to obtain the area of the vacant space in the skeleton structure. FIG. 7 shows an example of a photograph of the skeleton structure after the compression. Lattices of a 7-μm width are delineated; the vacant space in the skeleton structure is located at the center portion of the lattices. At the left-side vacant space, the number of lattices ($N_1$) that contain the vacant space in part of a lattice or in an entire lattice is 17, and the number of lattices ($N_2$) that contain the vacant space in an entire lattice is 0. Therefore, the area of the vacant space is:

$$7\times 7\ (\mu m^2)\times[0+(17-0)/2]=49\times 8.5=416.5\ (\mu m^2).$$

At the right-side vacant space, the number of lattices ($N_1$) that contain the vacant space in part of a lattice or in an entire lattice is 18, and the number of lattices ($N_2$) that contain the vacant space in an entire lattice is 2. Therefore, the area of the vacant space is:

$$7\times 7\ (\mu^2)\times[2+(18-2)/2]=49\times 10=490\ (\mu m^2).$$

The same calculations were conducted for 30 vacant spaces. The obtained values were averaged to obtain the average area of the vacant space. The average area was 657 μm². The average area after the compression is 49% of that before the compression. The filling capacity calculated by using the filling quantity of the active material is 8 mAh/cm².

Comparative Example 1

The same series of operations as that for Example 1 were performed, except that an aluminum porous body filled with the active material was compressed so as to have a thickness of 0.4 mm to produce an electrode for a nonaqueous-electrolyte battery. The average area of the vacant space is 486 μm². The average area after the compression is 36% of that before the compression. The filling capacity calculated by using the filling quantity of the active material is 8 mAh/cm². The above-described results are summarized in Table I.

TABLE I

| | Example 1 | Example 2 | Comparative example 1 |
|---|---|---|---|
| Average area of vacant space (μm²) | 1333 | 657 | 486 |
| 0.2 C service capacity (mAh/g) | 122 | 123 | 121 |
| 2 C service capacity (mAh/g) | 120 | 121 | 95 |

In Examples 1 and 2, which have a vacant space having an average area of 500 μm² or more, both the 0.2 C service capacity and the 2 C service capacity are large, showing that the active material has been utilized with 100% efficiency. Incidentally, lithium cobalt oxide has a 0.2 C service capacity of about 120 mAh/g. Because Example 2 has half the thickness of Example 1 and consequently can decrease the volume, it can increase the energy density while increasing the capacity of the battery. Comparative example 1 has a vacant space having an area of less than 500 μm². When the current is small, it has a large service capacity. However, when the current increases, the service capacity decreases, showing that it cannot perform high-rate charging and discharging. The reason seems to be that because in the compressing step, the vacant space in the skeleton structure is decreased excessively, the electrolyte solution becomes less likely to penetrate into the skeleton structure, so that the resistance of the electrode is increased.

REFERENCE SIGNS LIST

1: Foamed resinous formed body
2: Conductive layer
3: Aluminum plating layer
4: Skeleton structure
5: Aluminum layer
6: Vacant space
7: Active material

The invention claimed is:

1. An electrode material, comprising a sheet-shaped aluminum porous body carrying an active material; wherein:
   the aluminum porous body has a skeleton structure that is formed of an aluminum layer and that has a vacant space at the interior; and
   when observed by performing cutting in a direction parallel to the direction of thickness of the sheet, the vacant space in the skeleton structure has an average area of 500 μm² or more and 6,000 μm² or less.

2. The electrode material as defined by claim 1, wherein the aluminum layer has a thickness of 0.5 μm or more and 50 μm or less.

3. The electrode material as defined by claim 1, wherein the active material is at least one member selected from the group consisting of lithium cobalt oxide, lithium nickel oxide, lithium cobalt nickel oxide, lithium manganate, and lithium titanate.

4. A method of producing an electrode material, the method comprising:
   a step of preparing a sheet-shaped aluminum porous body having a skeleton structure that is formed of an aluminum layer and that has a vacant space at the interior;
   a filling step of filling an active material into the aluminum porous body; and
   a compressing step of compressing the aluminum porous body filled with the active material in the direction of thickness of the sheet;
   wherein after the compressing step, when observed by performing cutting in a direction parallel to the direction of thickness of the sheet, the vacant space in the skeleton structure has an average area of 500 μm² or more and 6,000 μm² or less.

5. The method of producing an electrode material as defined by claim 4, wherein the average area of the vacant space in the skeleton structure observed by performing cutting in a direction parallel to the direction of thickness of the sheet after the compressing step is 40% or more of the average area of the vacant space in the skeleton structure observed by performing cutting in a direction parallel to the direction of thickness of the sheet before the compressing step.

6. A battery, incorporating the electrode material as defined by claim 1 as a positive electrode, a negative electrode, or both.

7. A nonaqueous-electrolyte battery, incorporating the electrode material as defined by claim 1 as a positive electrode, a negative electrode, or both.

8. A capacitor, incorporating the electrode material as defined by claim 1 as a positive electrode, a negative electrode, or both.

* * * * *